Aug. 17, 1943.     C. G. TRIMBACH     2,326,904
AIRCRAFT GUN MOUNT
Filed July 24, 1940     3 Sheets-Sheet 1
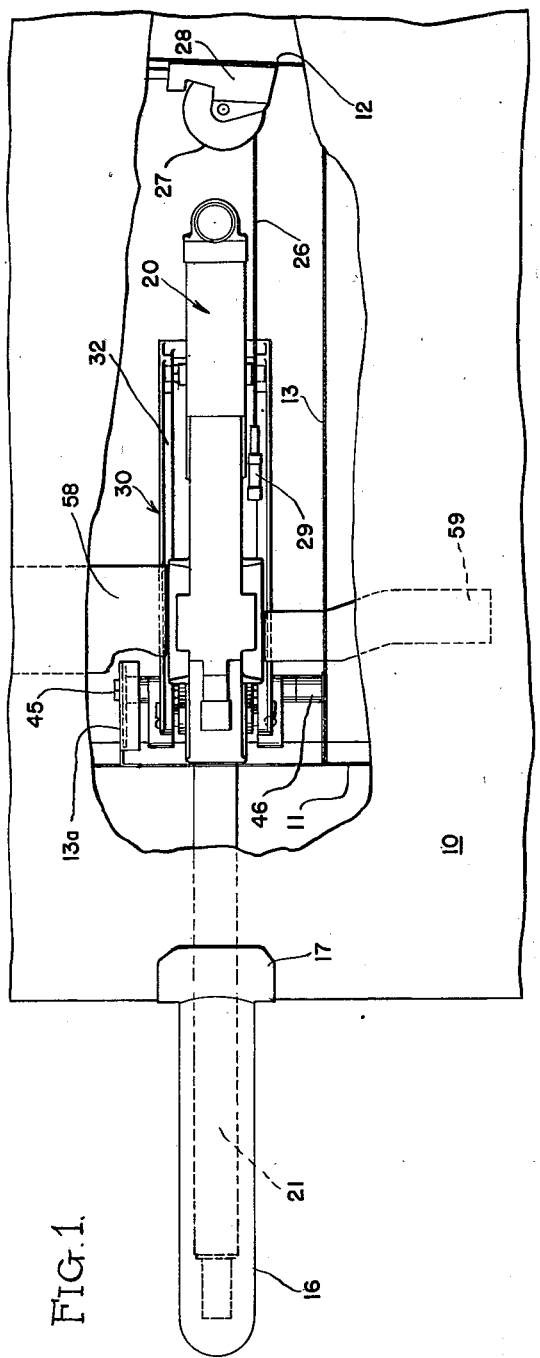
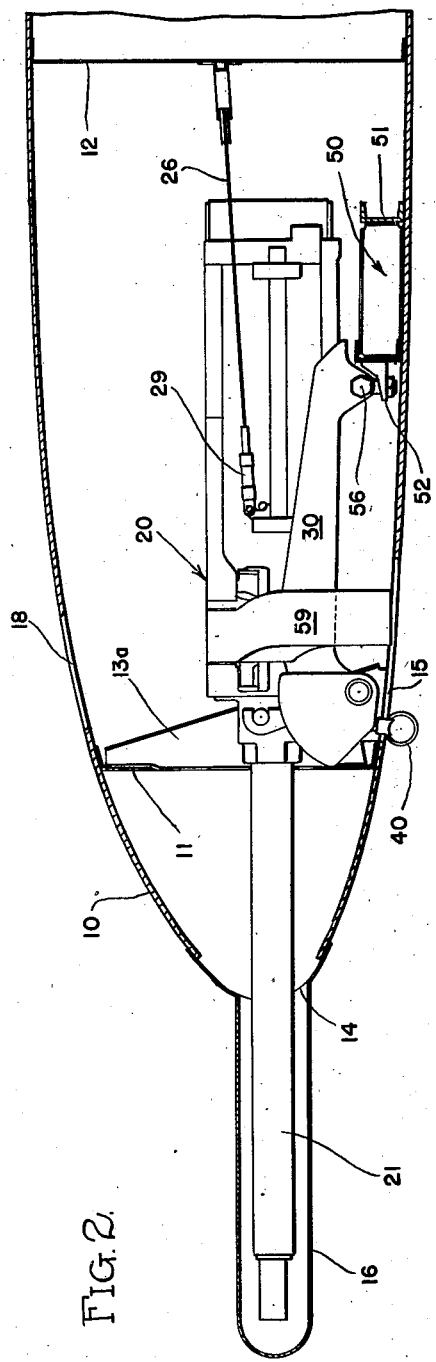
INVENTOR
CLEM G. TRIMBACH
BY
ATTORNEY Aug. 17, 1943.　　　C. G. TRIMBACH　　　2,326,904
AIRCRAFT GUN MOUNT
Filed July 24, 1940　　　3 Sheets-Sheet 2
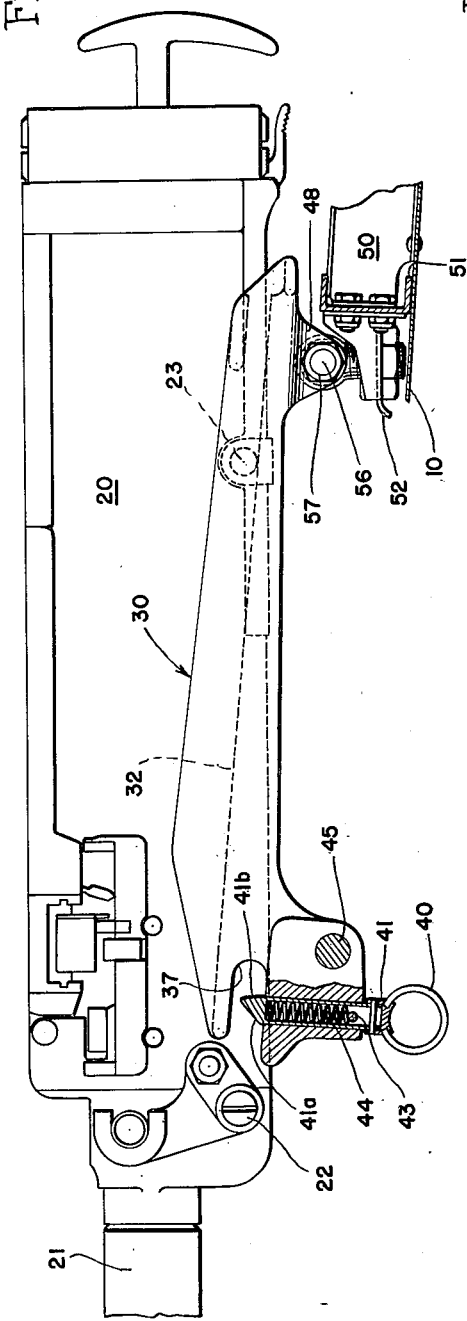
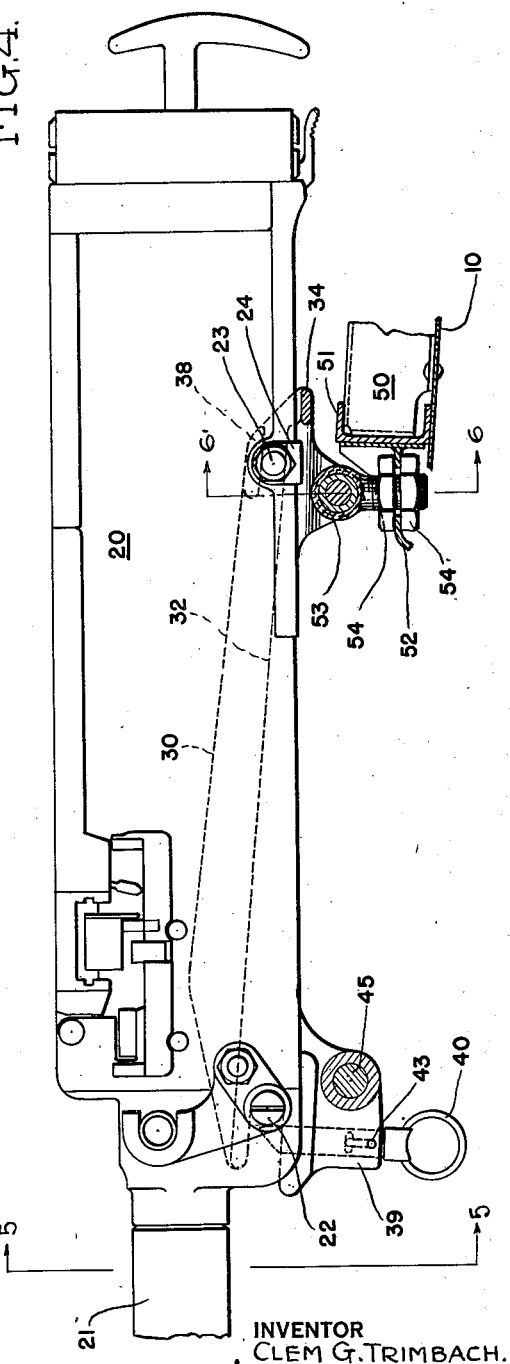
INVENTOR
CLEM G. TRIMBACH.
BY
ATTORNEY Aug. 17, 1943.    C. G. TRIMBACH    2,326,904
AIRCRAFT GUN MOUNT
Filed July 24, 1940    3 Sheets-Sheet 3
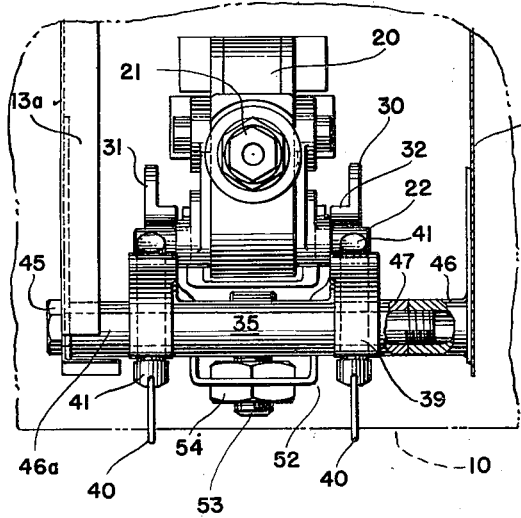
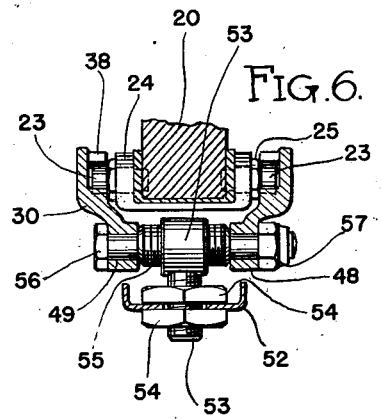
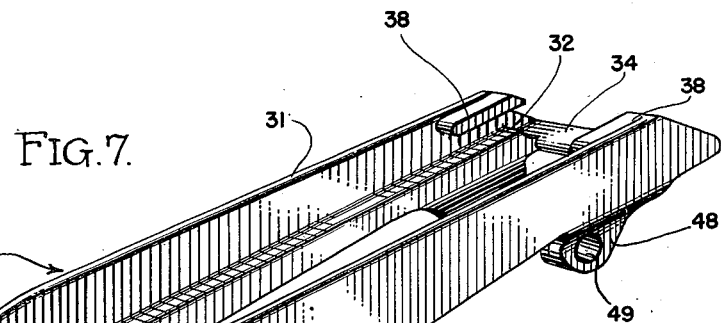
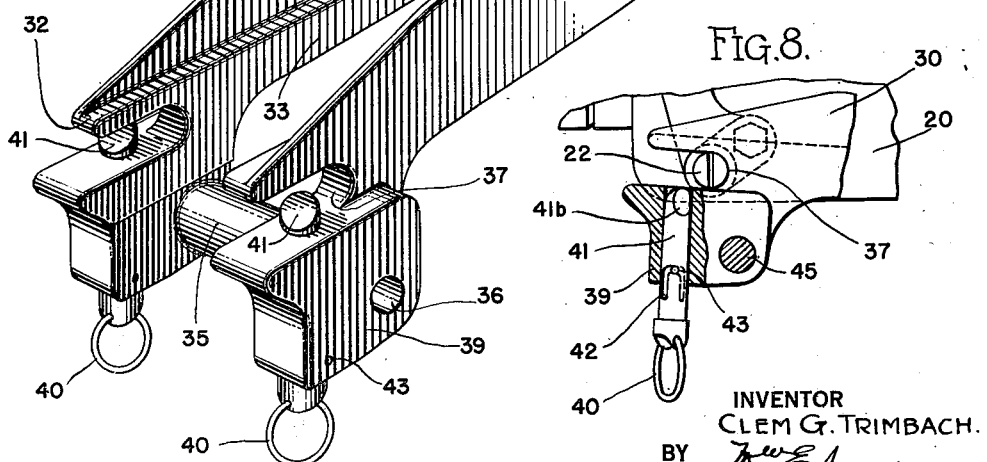
INVENTOR
CLEM G. TRIMBACH.
BY
ATTORNEY Patented Aug. 17, 1943

2,326,904

UNITED STATES PATENT OFFICE 2,326,904

AIRCRAFT GUN MOUNT

Clem G. Trimbach, Eggertsville, N. Y., assignor to Curtiss-Wright Corporation, a corporation of Delaware Application July 24, 1940, Serial No. 347,133

13 Claims. (Cl. 89—37.5)

The present invention relates to aircraft armament and more particularly to improvements in the mountings of fixed aircraft machine guns.

In prior practice machine guns have been mounted in fixed relationship on the fuselages of aircraft, either firing through the propeller shaft or synchronized to fire through the propeller disc, and have also been mounted in positions where they have been housed almost completely within the wings such that the line of fire passed outside of the disc area swept by the propeller blades. Fixed machine guns of these types are usually aimed by directing the longitudinal axis of the aircraft as defined by fixed reference points, or sights, toward the target. The fixed mounts which carry such guns must necessarily provide for removability of the gun for servicing and replacement, and the adjustment of the mount, together with the gun, in order to provide accurate fire control.

In that type of fixed machine gun in which the mount is attached within the confined spaces of the wings and similar portions of the aircraft, numerous difficulties have been met with in the facility with which the guns and their associated mounts could be removed, serviced and adjusted. Inasmuch as such guns are usually mounted upon relatively fast aircraft, the degree to which the aerodynamic surfaces and the interior structures of the bodies are disturbed by the openings and supporting structure necessary for the removal and servicing of the gun, has presented problems which have not entirely been overcome by prior devices. This has been particularly true in cases where prior methods of inserting the gun have been attempted in metal monocoque wings.

It is accordingly an object of the present invention to provide an improved mount for a fixed machine gun whereby the gun may be inserted in the mount through the leading edge of the surface of an airplane wing or the nose of a fuselage or nacelle in the axial direction of the gun. It is a further object to provide a mount in which the gun may be inserted in an axial direction such that the openings in the aerodynamic surfaces and their supporting structures, particularly when of monocoque construction, are reduced to a minimum and are slightly more than the cross sectional outline of the gun. A further object of the present invention is to provide a mount for a fixed gun containing guide means for properly positioning the gun during its installation, and in which the gun is automatically locked in its correctly sighted position by a single rectilinear movement of the gun to its limited position. Another object is the provision of quickly detachable gun locking means which do not require the use of any tools.

It is a further object to provide an improved gun mount cradle of simple rugged construction having its forward end pivoted, and provided with vertical and horizontal adjustment means at its rear end. Further objects reside in the novel form and operation of the cradle mount and its releasable trunnion locking means which absorbs all longitudinal and vertical recoil loads of the gun and whereby wear of the pin is automatically provided for in maintaining the gun in its tightly locked position. Another object contemplates a mount into which the gun may be slid either rearwardly breech end first or forwardly barrel end first as the installation circumstances dictate. Other objects and advantages of the present invention will become obvious to those skilled in this art after a reading of the present disclosure but all are intended to come within the embrace of this invention as hereinafter more particularly described.

In the drawings forming a part of this specification;

Fig. 1 is a plan view of a portion of an airplane wing partly broken away showing a fixed gun supported by a preferred embodiment of the mount comprising the present invention;

Fig. 2 is a cross sectional elevation of the same showing the gun and its mount in relationship to the wing structure;

Fig. 3 is an enlarged side view of the cradle mount showing the gun in a partially installed position;

Fig. 4 is a similar view showing the gun in its fully locked position with respect to the mount;

Fig. 5 is a front view of the gun and its mount as viewed in an axial direction along the lines 5—5 of Fig. 4 showing the forward support for the mount;

Fig. 6 is a cross sectional view also looking rearwardly at the lines 6—6 of Fig. 4;

Fig. 7 is a perspective view of the cradle mount; and

Fig. 8 is a detailed view of the forward gun trunnion in its slot in the mount and showing the locking means in its open position.

Referring now to Figs. 1 and 2, 10 indicates the forward portion of an airplane wing of monocoque construction provided with a front plate web 11, a similar rear web of channel cross section 12 and chordwise diaphragms or bulkheads 13. A fixed machine gun 20 is supported upon the cradle mount 30 in a fore and aft, or chordwise direction, such that the gun barrel 21 protrudes through an opening 14 in the leading edge of the wing. Similar openings 15 and 18 are provided through the under and upper surfaces of the wing respectively for access to the gun and its mount. These openings are relatively small and do not weaken the relatively high strength to weight ratio of the monocoque wing, being provided with flush type access covers (not shown). When installed but not in use, the gun barrel 21 and the wing opening 14 in the leading edge of the wing are protected by the fairing or cover 16 which has a flanged portion 17 formed to fit the leading edge contour of the wing. The cover 16 also serves to reduce the drag of the gun barrel and its opening during flight when the gun is not in use, and is preferably provided with suitable safety means such that the cover cannot be applied unless the gun is in its releasably locked position. Such a device is described in Patent No. 2,076,256 to R. A. Swalm et al. When the airplane is flown with the gun removed a close fitting plain type cap or cover seals the opening in the leading edge of the wing.

Referring now to Figs. 3, 4 and 7 the machine gun 20 is provided with forward trunnions, or lugs 22 extending laterally on both sides of the gun and similar rear trunnions 23 which are supported within the bottom clamp or yoke 24 being retained by the trunnion nuts 25. These trunnions 22 and 23 replace the usual bolts and nuts with which the gun is normally provided. As more clearly shown in Fig. 7 the cradle mount 30 comprises two laterally spaced vertical webs 31 forming spaced guides or tracks 32 by means of lower portions 33 of increased thickness. The spaced relationship of the portions 31 are maintained by the transverse tie portion 34 at the rear of the mount and the apertured tubular tie portion 35 positioned between the front portions 39. At the latter, or front, ends of the side portions 31 trunnion slots 37 are formed beneath the tracks 32 and have depending therefrom lug portions 39 forming the ends of the tie portion 35 and being transversely bored as at 36. The tracks extend substantially the full length of the mount and slope downwardly slightly toward the rear. The guide slot 37 preferably slopes downwardly and rearwardly similar to the guide track 32 and the lower portion of the guide slot 37 extends forwardly of the upper portion of the slot.

Each lug portion 39 is provided with a vertical bore to accommodate the latching mechanism generally indicated at 40 and comprising the plunger or latch 41 provided with a bayonet type slot 42 shaped to permit axial and rotative movements limited by the transverse pin 43. As more clearly shown in Fig. 3 the plunger 41 is tubular having a cylindrical internal recess which serves to house the compression spring 44 bearing against the upper end of the plunger and the pin 43 and tending to continually urge the plunger into its upward or trunnion locking position. The pin 43 serves to maintain the plunger 41 in its open position against the pressure of the spring when the plunger ring 40 is pulled down and rotated to cause the pin 43 to rest at the upper end of the slot 42 as shown in Fig. 8.

The pin 41 is beveled at its upper terminal in two directions. The beveled surface 41a facing toward the open end of the trunnion slot 37 is beveled more bluntly than the opposite face 41b in order to permit depression of the plunger against the action of the spring by the rearward movement of the trunnion 22 engaging the beveled surface 41a. The slightly beveled surface 41b of the pin 41 faces toward the inner end of the trunnion slot 37 in the upward, or locking, position of the pin and is beveled such that it bears against the cylindrical trunnion surface and thereby locks the gun securely to the cradle and is self-compensating regardless of the wear which may take place at either the trunnion or pin contact surfaces. The surface 41b and the pin are designed such that the upward movement of the pin as urged by the spring 44 is limited by its contact with the trunnion which takes place prior to the pin 43 reaching the lower end of the slot 42. The plungers thereby maintain a continuous tight grip on the trunnions due to the wedging action of the slight bevel 41b, even after wear occurs.

The cradle 30 is preferably attached to the wing structure with a pivotal mounting at its forward extremity and a mounting at its rearward portion which is capable of adjustment both vertically and horizontally, or in intermediate directions by combined adjustments in both directions. The tubular tie portion 35, as shown in Fig. 5, has a transverse bore 36 through which the mounting bolt 45 is adapted to fit closely. The chordwise bulkheads 13 and 13a in the wing structure preferably have attached thereto, either by welding, riveting or other suitable fastening means, the flanged stud fittings 46 and 46a, the fitting 46 being threaded to receive the end of the mounting bolt 45. A spacing sleeve 47 suitably bored to fit snugly about the bolt 45 is disposed between the fitting 46 and the lug portion 39 of the cradle.

The rear portion of the mount is carried by a structural support generally indicated at 50 in Figs. 3 and 4 and comprises channel sections 51 preferably riveted to the lower surface skin 10 of the wing in such a manner as to uniformly distribute the weight and recoil forces of the gun over a large area of the wing surface. The channel sections 50 and 51 are suitably framed to each other and the web of the forward channel has attached thereto a bracket fitting 52 having a forwardly extending web portion provided with an opening somewhat larger in diameter than the threaded stud 53 of the post assembly whereby the latter can be adjustably positioned with respect to the fitting 52 and locked in these positions by means of the nuts 54. The head portion of the post 53 is provided with a transverse threaded opening adapted to receive the threaded sleeve 55 which is arranged to fit between the depending lug portions 48. The latter form an integral part of the cradle and are provided with transverse bores 49 adapted to receive the mounting bolt 56. The shank of the latter bolt is keyed or otherwise suitably fastened to the threaded sleeve 55 in order that the sleeve is rotated by turning of the bolt head 56 for lateral adjustment of the mount and is locked in its adjusted position between the converging bosses 48 by the lock nut 57.

It will therefore be seen that the forward end of the cradle can be rotated within certain limits about the axis of the bolt 45, and with respect thereto, before the latter is tightened to rigidly clamp the cradle to the internal wing structure. It will also be noted that the rear portion of the cradle can be adjusted vertically, while the forward end has been released to move freely, by rotation of the nuts 54 on the vertical stud 53 for elevating or depressing the gun within the vertical plane. The threaded sleeve and stud are provided at the rear of the mount to take care of any slight inequality in the alignment of the flanged mounting studs 46 and 46a in their being welded to the bulkheads 13 and 13a, in order to facilitate the initial installation of the gun cradle. When the mount with its gun has been properly adjusted, usually by bore-sighting with a 90° mirror for alignment to converge at a predetermined range with fixed sights disposed in the fuselage convenient to the pilot, the bolts 45, 53 and 56 are each locked by tightening of their respective nut.

When inserting the gun into its mount the cover 16 is removed from the wing leading edge, the gun is held by its barrel portion and is moved breech end first in an axial chordwise direction through the opening 14 in the wing leading edge and through the corresponding opening in the web 11 until the rear trunnions 23 rest upon the track 32. Rearward movement of the gun is then continued while the trunnion 23 slides or rolls rearwardly down the track 22 until the front trunnions are aligned with the open end of the slot 37. The plungers 41 are depressed as the gun is pushed rearwardly by engagement of the trunnions 22 with the beveled surface 41a of the plunger acting downwardly against the pressure of the spring 44. As the gun reaches its final position with the trunnion 22 in the slot 37 the spring causes the plunger 41 to return upwardly with a snapping action into a position where the beveled contact surface 41b of the plunger bears against the front trunnion and retains the gun firmly in its final position. In this position the rear trunnions 23 are positioned in the rear extremity of the track 32 and directly beneath the upper track flanges 38 which are very accurately positioned and finished to closely fit against the upper surface of the rear trunnions to prevent any play or lost motion in a vertical direction about the axis of the front trunnions, since vertical steadiness is all that is required at the rear end of the gun.

It will be noted that the relationship of the front trunnions to the mount permits only rotative movement between the mount and the gun which movement is prevented by the relationship of the rear trunnion to the mount which normally permits only rectilinear movement along the inclined track 32. Accordingly, all of the longitudinal and vertical recoil forces exerted by firing of the gun are transmitted to the mount by bearing of the front trunnions against the slot 37 and are distributed directly through its front support and also rearwardly through the length of the mount to its rear support. The only appreciable loads transmitted to the cradle through the rear trunnion are due to the weight of the gun and to a lesser extent certain vertical components of the recoil forces. No longitudinal forces can be transmitted to the mount by the rear trunnions.

The gun installation is further provided with the usual ammunition box 58 disposed at the inboard side of the gun and the detachable ammunition chute 59 located on the opposite side of the gun; right hand gun feed being shown. The cradle mount and its support are however adapted for either right or left hand feed. Suitable manual gun charging means is provided by the cable 26 suitably guided over the sheave 27 supported on the bracket 28. The cable extends into the fuselage to a position convenient to the operator, and attached to the gun by means of suitable quick detachable fitting 29, preferably urged into the return position by a tension spring (not shown). The gun installation is further provided with suitable remote control firing mechanism which also is not shown and does not form a part of the present invention. The electric trigger connections are, however, also quickly detachable to facilitate the rapid removal and installation of the gun without the use of tools.

While the embodiment has been shown and described as applying to an airplane wing, it will become apparent that the improved gun mount is adapted for installation to other parts of an airplane or any other vehicles. It should also be noted that the mount is equally adapted for insertion of the gun from the rear, the gun merely being pulled rearwardly for snapping into position after the front trunnions drop from the top of the webs 31 onto the lip of the portion 39. Although but one preferred form of the present invention has been shown it will become obvious to those skilled in the art after a reading of the present specification and the attached drawings that various changes and modifications may be made which are intended to come within the scope of this invention as more definitely recited in the appended claims.

What is claimed is:

1. In a fixed gun mount for an aircraft wing, a gun having fore and aft pairs of attachment lugs, a gun mount provided with longitudinally extending guide means adapted for longitudinal movement of said aftermost pair of lugs therealong, and forwardly opening slots in said mount provided with releasable locks for retaining said forward lugs therein, the said guide means extending both forwardly and rearwardly of the locked position of said forward attachment lugs in said slots.

2. In a fixed gun mount for an aircraft wing of monocoque construction, a gun having fore and aft pairs of attachment lugs, a gun mount provided with longitudinally extending guide means adapted for longitudinal movement of said aftermost pair of lugs therealong, and slot means in the forward portion of said mount disposed beneath said guide means, releasable lock means disposed in said slot means for retaining said forward lugs therein, and means to prevent lifting of said aftermost lugs from said guide means in said locked position.

3. In an aircraft gun mount for a fixed gun having fore and aft pairs of attachment lugs, said mount comprising two laterally spaced web portions interconnected adjacent their fore and aft terminals by integral tie elements, the said web portions being provided with thickened inwardly facing lower portions forming longitudinally extending guide tracks for said gun lugs, forwardly opening guide slots disposed beneath the forward portions of said guide tracks and means associated with said guide slots for releasably locking said forward gun lugs within said guide slots and said aftward gun lugs upon said guide track.

4. In aircraft armament, a wing of monocoque construction, a gun mount adjustably supported by the said wing structure disposed in a chordwise direction, a normally fixed gun provided with fore and aft transverse lugs adapted for releasable attachment to said mount, forwardly opening guide tracks and slots formed in said mount, the leading edge of said wing provided with an opening whereby the said gun is engaged with the guide tracks and slots of said mount by rearward rectilinear movement of said gun through the said leading edge opening, and automatic means to lock said lugs to said mount actuated by positioning of said gun at the rearward limit of its chordwise movement.

5. In a fixed gun mount for an aircraft wing of monocoque construction, a gun having fore and aft attachment lugs, a gun mount provided with longitudinally extending guide means adapted for longitudinal movement of said aftermost lugs therealong, slot means in the forward portion of said mount disposed beneath said guide means and provided with releasable lock means for retaining said forward lugs therein, and means disposed over the rear portion of said guides adapted to prevent other than said longitudinal movement of said aftermost lugs in the locked position only of said forward lugs.

6. In aircraft armament, a wing of monocoque construction, a gun mount adjustably supported by the said wing structure disposed in a chordwise direction, a fixed gun carrying transverse lugs adapted for releasable attachment to said mount, said wing having an opening in the leading edge thereof through which the said gun is engaged with said mount by rearward rectilinear movement of said gun through the said leading edge opening, and automatic means to lock said lugs to said mount actuated by positioning of said gun at the rearward limit of its chordwise movement, the said mount being adjustably pivoted on a transverse axis to the wing structure at a forward portion and adjustably attached at its rear portion by means adapted to provide vertical elevational adjustment of said gun about said transverse axis.

7. In an aircraft gun installation, a fixed gun having laterally extending pairs of attachment trunnions, a mount comprising laterally spaced longitudinally extending guide tracks normally sloping downwardly from front to rear of the mount, guide slots formed in said mount with the said slots opening forwardly, locking pins releasably positioned within said slots, spring means adapted to urge said pins into positions wherein at least one pair of said gun trunnions are locked within said slots, beveled faces forwardly disposed on said pins to permit retraction against said spring means as said trunnions are moved into their locking positions and additional beveled faces on the opposite sides of said pins adapted to be urged by said spring means into continual wedging relationship with said trunnions when in their locked positions adapted to compensate for wear, and blocking means adjacent the remote portions of said guides adapted to prevent other than longitudinal movements of a remaining pair of gun trunnions therealong.

8. In aircraft construction, a gun mount for a fixed gun, said mount comprising two laterally spaced web portions interconnected adjacent their terminals by integral tie elements, the said web portions being provided with thickened inwardly facing lower portions forming longitudinally extending guide tracks for said gun, forwardly opening guide slots disposed beneath the forward portions of said guide tracks and means positioned within said guide slots for releasably locking said gun within said guide slots and upon said guide track, and further gun retaining means disposed at the opposite portions of said guide tracks comprising flanged portions spaced above and inwardly extending from said web portions adapted to prevent vertical movement of said gun with respect to said guide track.

9. In aircraft construction, a fixed gun provided with at least two pairs of laterally extending lugs, and a gun mount comprising laterally spaced elements forming longitudinally extending guide track means for the rear pair of said gun lugs, the said guide track means sloping downwardly in a rearward direction and being open at both its forward and rearward terminals, similarly sloping guide slots disposed at the front portion of said mount and adapted to be releasably engaged by a front pair of said gun lugs, said guide slots being open forwardly and having its upper portion formed by the forward portion of said guide track, the lower portion of said guide slot extending forwardly beyond the said upper portion, whereby the said gun may be inserted into said mount by rectilinear movement of said gun lugs along both said guide means.

10. In a fixed aircraft gun mount, an aircraft wing of monocoque construction having external skin surfaces and spanwise webs, the leading edge of said wing and at least one of said webs having aligned chordwise openings, a gun having a breech portion adapted to be inserted rearwardly breech end first through said aligned openings, a cradle mount attached at its forward and rearward ends to said wing structure, means extending substantially the entire chordwise length of said mount for guiding the breech end of said gun with respect to said mount and releasable means for attaching a forward portion of said gun to said mount engaging lugs carried by said gun, said mount having forwardly opening slots within which said lugs are adapted to be slid after insertion of the gun through said wing openings, and means for locking said lugs within said slots.

11. In an aircraft gun mount, an aircraft, a normally fixed gun having forward and rearward attachment elements, a mount for said gun enclosed within the exterior surfaces of said aircraft, one of said surfaces having an opening therein in alignment with the longitudinal axis of said mount and adapted to permit passage therethrough of the gun in its axial direction only, the said mount being provided with at least two superimposed sets of guides, the upper guides extending for at least a distance equivalent to that between said forward and rearward elements, means associated with said lower guides to limit rearward longitudinal movement of said forward elements and further means to automatically lock the same to the mount at said limit of movement, and fixed means adapted to be engaged with said rearward elements to oppose pivotal rotation of the gun about said forward elements in their locked position.

12. In an aircraft gun mount, an aircraft wing, a normally fixed machine gun, laterally extending attachment members carried by said gun, a unitary gun mount supported by said wing, laterally spaced longitudinally extending guides carried by said mount for fore and aft movement of said attachment members therealong, forwardly opening releasable locking means carried by a forward portion of said mount for engaging the foremost of said attachment members, and forwardly opening blocking means adjacently spaced above said guides and remote from said locking means to prevent movements of the rearmost of said attachment members in other than said fore and aft direction.

13. In an aircraft gun installation, a fixed gun provided with front and rear pairs of laterally extending attachment trunnions, a mount comprising laterally spaced guide tracks normally sloping downwardly from front to rear of the mount for the positioning of said rearward trunnions therealong, forwardly opening guide slots at the forward portion of said mount, locking pins releasably disposed in said slots, spring means adapted to urge said pins into positions wherein the forward pair of said gun trunnions are locked within said slots, said pins having forwardly disposed beveled faces adapted to permit retraction against said spring means as said runnions are moved into their locking positions, and additional beveled faces on the opposite sides of said pins adapted to be urged by said spring into continual wedging relationship with said forward trunnions adapted to compensate for wear.

CLEM G. TRIMBACH.